United States Patent [19]

Renner et al.

[11] 4,209,697

[45] Jun. 24, 1980

[54] METHOD FOR PRODUCING SELECTED MASS SPECTRA

[75] Inventors: Gerhard Renner, Gräfeling; Eberhard Unsöld, Munich, both of Fed. Rep. of Germany

[73] Assignee: Gesellschaft für Strahlen-und Umweltforschung mbH München, Neuherberg, Fed. Rep. of Germany

[21] Appl. No.: 872,572

[22] Filed: Jan. 26, 1978

[30] Foreign Application Priority Data

Jan. 26, 1977 [DE] Fed. Rep. of Germany ....... 2703047

[51] Int. Cl.[2] ........................ B01D 59/44; H01J 39/40

[52] U.S. Cl. ................................ 250/282; 250/423 P

[58] Field of Search ........... 250/281, 282, 287, 461 B, 250/423 P, 492 R; 219/121 L; 204/DIG. 11

[56] References Cited

U.S. PATENT DOCUMENTS 3,813,544 5/1974 Franzen et al. ...................... 250/281

OTHER PUBLICATIONS

"Photofragment Spectrometer", Busch et al. Univ. of Cal. vol. 41, No. 7, Jul. 1970, pp. 1066–1073.

*Primary Examiner*—Bruce C. Anderson

*Attorney, Agent, or Firm*—Spencer & Kaye

[57] ABSTRACT

In a method for producing selected mass spectra by directing electromagnetic radiation through an optical system onto sample material for vaporization, destruction, excitation and/ or ionization in the microrange, setting the expanse of the irradiation region of the sample by selection of the energy density of the radiation, and detecting the released particles, the radiation power density is varied for producing mass spectra having respectively different proportions of atom and molecule spectra.

5 Claims, 12 Drawing Figures

METHOD FOR PRODUCING SELECTED MASS SPECTRA

BACKGROUND OF THE INVENTION

The invention relates to a method for producing selected mass spectra with the use of electromagnetic radiation which is directed onto sample material through an optical system for vaporization, destruction, excitation and/or ionization in the microrange wherein the expanse of the irradiated regions of the sample is adjustable by selection of the energy density of the radiation and the released particles are detected.

A laser microanalysis device is known (German Offenlegungsschrift [laid-open patent application] No. 2,141,387) in which biological material is microanalyzed and, in order to cause the irradiated area to be smaller than the cell size, the power density of the radiation is set so that when focused in the diffraction maximum of zero order it lies above, and in the diffraction maximum of the first order it lies below, the limit at which a sudden increase in absorption takes place in the test sample material. This controls only the spatial resolution of the process but does not influence the shape or composition, respectively, of atomic and/or molecular spectra, because this composition is not necessarily (possibly accidentally) coupled with the sudden absorption behavior.

It is also known (BIST-CEA No. 204, June, 1975) to make a mass spectrometric analysis of test samples by means of an incident laser light method wherein the detection of atomic spectra is desired.

SUMMARY OF THE INVENTION

In contradistinction thereto, it is the object of the present invention to provide a method which can be automated in electron scan microscope application without restricting its efficiency and with which test sample mass analyses can be performed to provide qualitative and quantitative information regarding the organic and/or inorganic components but wherein the composition of the relative frequencies of the components with respect to one another can be varied.

On the basis of surprising experimental discoveries, the solution of this problem is that the mass spectra are combined from certain relative atom and/or molecule frequencies by means of variation of the power density.

A further development of the invention provides that, in order to calibrate the mass spectra, the released particles are measured directly or the electric current produced by them is measured.

According to particularly advantageous embodiments of the method according to the invention, the variation of the power density of the electromagnetic radiation is effected by means of various radiation sources, in electrooptical and/or optical pulse generators downstream of the radiation source or at the radiation source itself.

DESCRIPTION OF THE PREFERRED EMBODIMENTS

Figure 1:
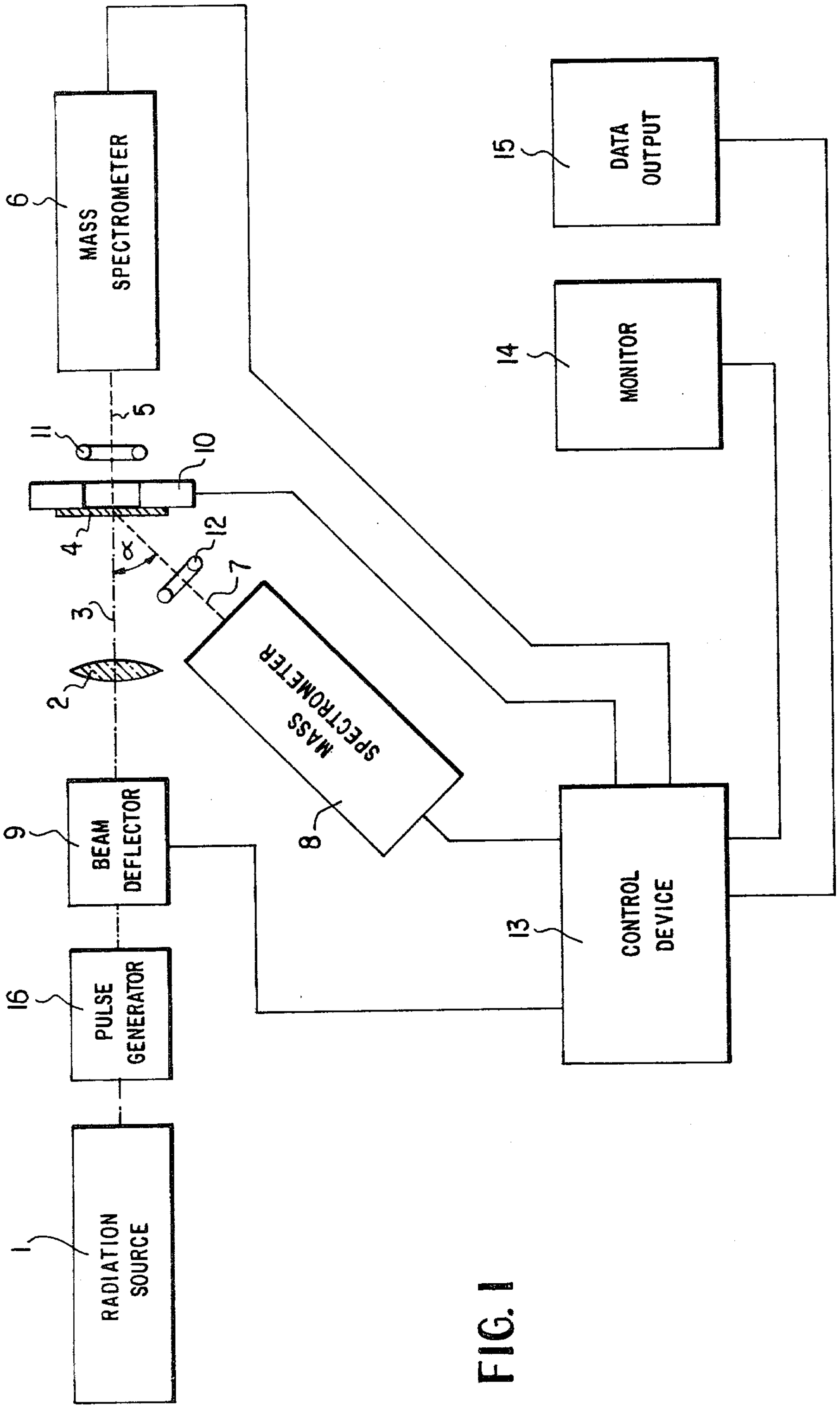
FIG. 1 is a partly pictorial, partly schematic view of a preferred embodiment of apparatus for practicing the present invention.

In FIG. 1, an analysis system is shown schematically. A laser beam 3 is focused on a test sample 4 through an optical system 2 by means of a radiation source 1 and holes are there produced whose minimum diameters lie in the micron range. The diameters are limited only by the diffraction and resolution capability of the optical system 2 and by the characteristics of the radiation source 1. The particles produced at the respective points are either sucked away in the irradiation direction 5 by the electrical field of a mass spectrometer 6 or in the direction of the incident light 7, respectively, by means of the equivalent electrical field of a mass spectrometer 8 and their components are analyzed there. The sample 4 may be scanned by the laser beam 3 in a grid pattern (one atomic and/or molecular spectrum is then produced per grid point), in which case the laser beam 3 is deflected by a beam deflector 9 over the surface of the sample, or the sample table 10 is moved in a scanning manner. The particle stream which evaporates from the points on which the laser beam 3 impinges is detected by means of Rogowsky coils 11, 12, respectively, as a current representative of total ion number, $N_0$, and is used to calibrate the atomic and/or molecular spectra to be detected. Equivalent detector elements may be provided instead of the Rogowsky coils 11 and 12, such as, for example, capacitor plates.

The mass spectrometers 6 and 8 as well as the beam deflector 9 and/or the sample table 10 can be controlled by means of a control device, such as data store 13. The spatial, areal and time display of the atomic and/or molecular spectra as well as selected mass spectra with respect to mass and amplitude can then be effected via a monitor 14 or via a data output 15.

The laser beam 3 can be varied with respect to energy density, power density, pulse duration and wavelength either by means of an electrooptical pulse generator 16 and/or adjustment of the radiation source 1, or a plurality of radiation sources are arranged in juxtaposition and/or one behind the other and are selectively cut into the beam path of the microanalysis device.

The energy density of the radiation 3 is high enough so that the irradiated volume of the sample is vaporized and partially ionized. The resulting ions and/or ionized molecular fragments are analyzed by means of mass spectrometers 6, 8, respectively, for example according to the time of flight method, the spectrometer 6, 8, respectively, producing the complete mass spectrum of the vaporized sample volume for each individual laser or radiation pulse, respectively. These atomic and/or molecular spectra are of particular interest for use in biomedicine, material analysis, environmental protection, criminology, etc.

Figure 2:
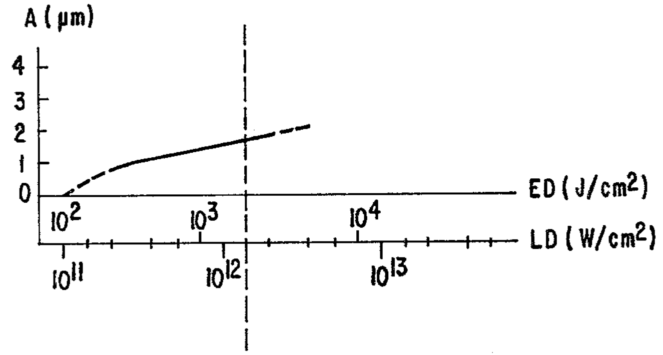
FIGS. 2–5 are performance diagrams illustrating operation of the apparatus of FIG. 1.
Figure 3:
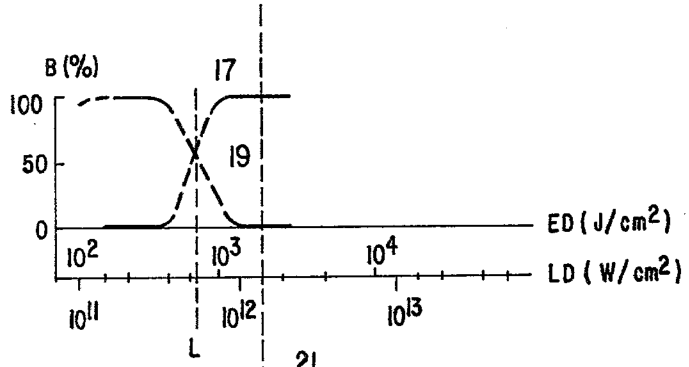
Figure 4:
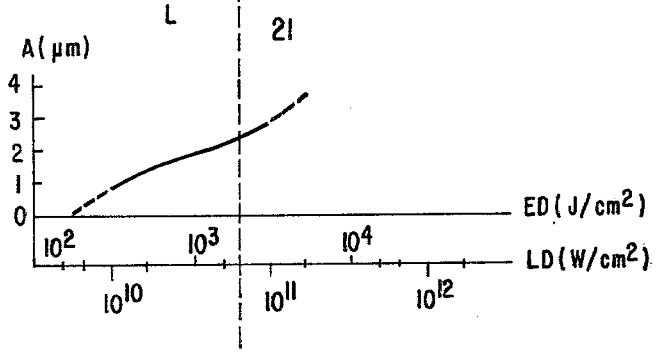
Figure 5:
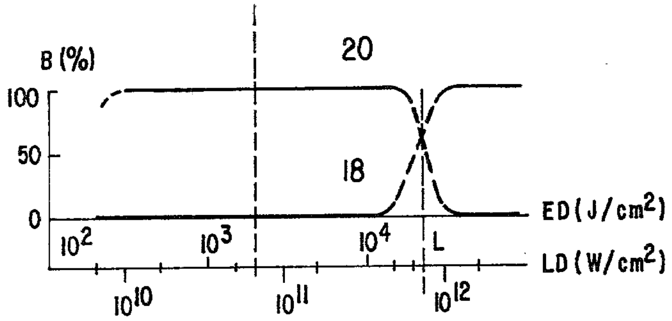

The pulse level and the composition of the atomic and/or molecular spectra are produced by variation of the power and energy density of the beam 3. FIGS. 2 to 5 show the influence of the radiation pulse duration of a nitrogen laser and a ruby laser with frequency doubling at similar wavelengths and thus approximately identical absorption in the sample but with mutually different pulse durations for a sample of epoxy resin Epon 812. FIGS. 2 and 4 show the diameters A of the produced holes in microns in dependence on the energy density ED in $J/cm^2$ and the power density LD in $W/cm^2$. These holes are shot into the samples 4 by the beams 3 (see FIG. 1). FIGS. 3 and 5, on the other hand, are graphs of the relative frequency B in percent over the energy density ED or power density LD, respectively. Curves 17 and 18 show the relative frequencies of atomic hydrogen with a mass 1, and curves 19 and 20 show the relative frequencies of a molecular fragment with the mass 27. Mass 27 is any arbitrarily selected mass which need not be identical with aluminum and which is symbolic for the molecular mass lines that occur. Correspondingly, mass 1 is assumed to be symbolic for the atom lines.

Comparison of the two diagrams shows that the diameters A of the holes and thus of the vaporized sample volume depend essentially on the energy density ED which is generated in sample 4. The relative frequency B (FIGS. 3 and 5) of the atom and molecule ions, however, is a function of the power density LD. The pulse durations of the two lasers differ by the factor 25 and are $\tau=1.2$ nsec with a nitrogen laser and $\tau=30$ nsec with a ruby laser, respectively. Based on such a diagram (FIG. 3 or FIG. 5), it is thus possible to determine those laser or irradiation parameters which, with a certain perforation or hole diameter A, produce a spectrum of atom ions and/or molecule ions. The vertical, broken line 21 in FIGS. 2 to 5 represents, for example, a possible set of parameters for beam 3 where energy density $ED=2\times10^3$ J/cm$^2$, power density $LD=1.3\times10^{12}$ or $6\times10^{10}$ W/cm$^2$, respectively, when the hole diameter A is about $2\mu$. The thickness of the sample 4 is $0.1\mu$.

Figure 6:
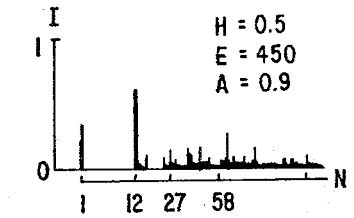
FIGS. 6–12 are diagrams illustrating spectra produced by the operation of the apparatus of FIG. 1.
Figure 7:
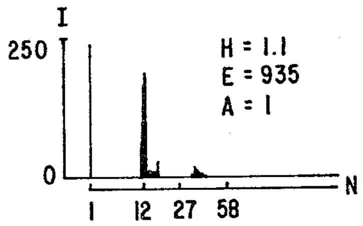
Figure 8:
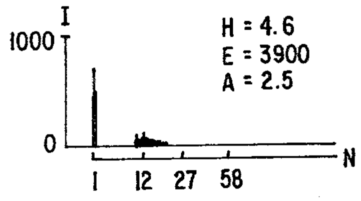
Figure 9:
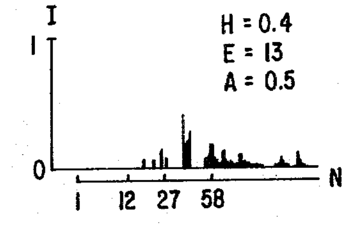
Figure 10:
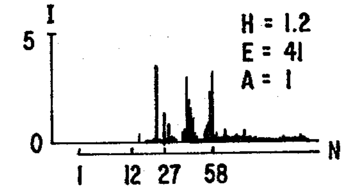
Figure 11:
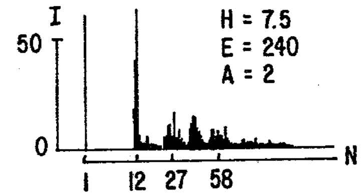
Figure 12:
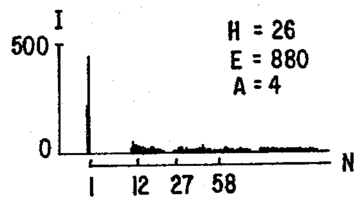

FIGS. 3 and 5 also show that the production rate of one type of particles, here for example atomic hydrogen (curves 17 and 18) changes with respect to that of another type of particles, here, for example, mass 27 (curves 19 and 20), the threshold value power density L, here about $9\times10^{11}$ W/cm$^2$, remaining unchanged, and this independently of the pulse duration of the laser. With power densities less than the threshold power density L, mostly molecule spectra are produced, with higher power densities they are mostly atom spectra. By varying the power density LD of the radiation source 1 of FIG. 1, it is thus possible to control the appearance of the atom and/or molecule spectra as shown in FIGS. 6 to 8 for a nitrogen laser and in FIGS. 9 to 12 for a ruby laser. The appearance and disappearance, respectively, of atomic and molecular peaks in the spectra indicates the various degrees of ionization and dissociation in the microplasma. The ion signal is plotted in relative units I over the mass number N for an epoxy resin sample of a thickness of $0.3\mu$. These mass spectra were recorded by means of the mass spectrometers 6 according to FIG. 1. Also plotted for every spectrum is the irradiation intensity H in KJ/cm$^2$, the radiation intensity E in GW/cm$^2$ and the hole diameter A in $\mu$.

We claim:

1. In a method for producing selected mass spectra by directing electromagnetic radiation through an optical system onto sample material for vaporization, destruction, excitation and/or ionization in the microrange, setting the expanse of the irradiated region of the sample by selection of the energy density of the radiation, and detecting the released particles, the improvement comprising varying the radiation power density for producing mass spectra having respectively different proportions of atom and molecule spectra.

2. Method according to claim 1 further comprising, for purposes of indicating the total ion number forming the mass spectra, directly measuring the released particles or measuring the electrical current generated by the particles.

3. Method according to claim 2 wherein said step of varying the power density of the electromagnetic radiation is carried out by supplying radiation from various selected ones of a plurality of radiation sources.

4. Method according to claim 2 wherein said step of varying the power density of the electromagnetic radiation is carried out by subjecting the radiation to control by an electrooptical and/or optical pulse generator.

5. Method according to claim 2 wherein the radiation is supplied by a radiation source and said step of varying the power density of the electromagnetic radiation is carried out by adjusting the radiation source.

* * * * *